US011320033B2

(12) United States Patent
Deng et al.

(10) Patent No.: US 11,320,033 B2
(45) Date of Patent: May 3, 2022

(54) DIFFERENTIAL ASSEMBLY FOR SHIFTING

(71) Applicant: DONGFENG DANA AXLE CO., LTD., Hubei (CN)

(72) Inventors: Fumin Deng, Xiangyang (CN); Shengli Hu, Xiangyang (CN); Buliang Zhang, Xiangyang (CN); Shanshan Hu, Xiangyang (CN)

(73) Assignee: DONGFENG DANA AXLE CO., LTD., Hubei (CN)

(*) Notice: Subject to any disclaimer, the term of this patent is extended or adjusted under 35 U.S.C. 154(b) by 0 days.

(21) Appl. No.: 16/642,872

(22) PCT Filed: Aug. 31, 2018

(86) PCT No.: PCT/CN2018/103416
§ 371 (c)(1),
(2) Date: Feb. 27, 2020

(87) PCT Pub. No.: WO2019/042385
PCT Pub. Date: Mar. 7, 2019

(65) Prior Publication Data
US 2020/0347921 A1 Nov. 5, 2020

(30) Foreign Application Priority Data

Aug. 31, 2017 (CN) .......................... 201721110120.2

(51) Int. Cl.
*F16H 48/08* (2006.01)
*B60K 17/08* (2006.01)
(Continued)

(52) U.S. Cl.
CPC ............. *F16H 48/08* (2013.01); *B60K 17/08* (2013.01); *B60K 17/16* (2013.01); *F16H 3/089* (2013.01);
(Continued)

(58) Field of Classification Search
CPC ...... F16H 48/08–2048/087; F16H 3/087–097; F16H 2200/0034; B60K 17/06–08; B60K 17/16–20
See application file for complete search history.

(56) References Cited

U.S. PATENT DOCUMENTS 2,152,771 A * 4/1939 Ormsby .............. F16H 37/0813
475/206
2,384,781 A * 9/1945 Rockwell ................. B60K 5/08
180/247
(Continued)

FOREIGN PATENT DOCUMENTS

CN 101691105 A 4/2010
CN 201501298 U 6/2010
(Continued)

OTHER PUBLICATIONS

ISA State Intellectual Property Office of the People's Republic of China, International Search Report and Written Opinion Issued in Application No. PCT/CN2018/103416, dated Nov. 21, 2018, WIPO, 10 pages.

*Primary Examiner* — David R Morris
(74) *Attorney, Agent, or Firm* — McCoy Russell LLP

(57) ABSTRACT

A differential assembly includes a differential. The differential includes a differential housing configured for rotation. A shifting assembly includes a first portion that is mounted to the differential and a second portion that is mounted to an output shaft. A movable shifting collar disposed around the differential housing selectively engages gears.

18 Claims, 3 Drawing Sheets

(51) Int. Cl.
  *B60K 17/16*     (2006.01)
  *F16H 3/089*     (2006.01)
  *F16H 48/36*     (2012.01)
(52) U.S. Cl.
  CPC .. *F16H 2048/082* (2013.01); *F16H 2048/366* (2013.01); *F16H 2200/0034* (2013.01)

(56) References Cited

U.S. PATENT DOCUMENTS

| | | | | |
|---|---|---|---|---|
| 2,521,730 | A * | 9/1950 | Keese | F16H 48/08 192/53.361 |
| 2,858,713 | A * | 11/1958 | Brownyer | F16H 37/046 475/203 |
| 3,732,943 | A * | 5/1973 | Panhard | B60K 17/16 180/55 |
| 5,292,290 | A * | 3/1994 | Scholz | B60K 17/08 192/53.34 |
| 6,007,449 | A | 12/1999 | Okada et al. | |
| 9,033,839 | B2 * | 5/2015 | Rossey | B60K 17/02 475/150 |
| 9,102,226 | B2 * | 8/2015 | Makino | B60K 6/52 |
| 9,821,654 | B2 * | 11/2017 | Hart | B60K 17/08 |
| 2012/0158233 | A1 * | 6/2012 | Makino | B60K 6/383 701/22 |
| 2015/0038277 | A1 * | 2/2015 | Tamura | H02K 7/108 475/150 |
| 2016/0377157 | A1 * | 12/2016 | Hart | B60K 17/08 475/205 |
| 2020/0158218 | A1 * | 5/2020 | Himmelbauer | B60K 17/165 |
| 2020/0254870 | A1 * | 8/2020 | Zhang | B60B 35/14 |

FOREIGN PATENT DOCUMENTS

| | | | |
|---|---|---|---|
| CN | 103267103 A | | 8/2013 |
| CN | 205818937 U | | 12/2016 |
| CN | 206954009 U | | 2/2018 |
| CN | 207261604 U | | 4/2018 |
| FR | 502023 A | * | 5/1920 ............. B60K 17/04 |

* cited by examiner

DIFFERENTIAL ASSEMBLY FOR SHIFTING

CROSS-REFERENCE TO RELATED APPLICATIONS

The present application is a U.S. National Phase of International Application No. PCT/CN2018/103416, entitled "DIFFERENTIAL ASSEMBLY FOR SHIFTING", and filed on Aug. 31, 2018. International Application No. PCT/CN2018/103416 claims priority to Chinese Utility Model Application No. 201721110120.2 filed on Aug. 31, 2017. The entire contents of each of the above-listed applications are hereby incorporated by reference for all purposes.

BACKGROUND

The invention relates to a differential assembly. More particularly, the invention relates to a differential assembly having a shifting collar.

Differential assemblies known in the art typically include a gearbox to alternate between speeds. Such arrangements can suffer from efficiency losses due to the number of transmission connections. Additionally, these assemblies are large, complex and expensive to manufacture. Therefore, it would be desirable to improve the transmission efficiency, provide a compact structure, and reduce the cost and complexity to manufacture such an assembly.

SUMMARY

Embodiments of a differential assembly are provided.

In an embodiment, the differential assembly comprises a differential. The differential includes a differential housing configured for rotation. A shifting assembly includes a first portion that is mounted to the differential and a second portion that is mounted to an output shaft.

Preferably, the first portion of the shift assembly comprises a first driven gear, which is disposed about an outer surface of the differential housing, and a second driven gear, which is disposed about the outer surface of the differential housing. The first driven gear and the second driven gear are selectively engaged with the differential housing.

Preferably, the first driven gear is engaged with a first active gear coupled to the output shaft and the second driven gear is engaged with a second active gear coupled to the output shaft.

In an embodiment, the first driven gear, the first active gear, the second driven gear, and the second active gear are each of a cylindrical shape.

In another embodiment, the first driven gear and the second driven gear are each a spur gear.

Preferably, the second portion of the shift assembly comprises a first active gear, which is coupled to the output shaft, and a second active gear, which is coupled to the output shaft.

Preferably, the differential housing has an axis of rotation and the output shaft has an axis of rotation that is in a parallel relationship with the axis of rotation of the differential assembly.

In an embodiment, the first active gear and the second active gear are each a spur gear.

Preferably, a movable shifting collar is disposed around the differential housing. The shifting collar is engaged with one of a first driven gear and a second driven gear.

In some embodiments, the first driven gear and the second driven gear each have meshing teeth and the shifting collar is engaged with one of the first driven gear and the second driven gear via the meshing teeth.

Preferably, the shifting collar is configured to slide over the differential housing to engage the first driven gear or the second driven gear.

Preferably, a fork is coupled to the shifting collar and moves the shifting collar into engagement with the first driven gear or the second driven gear.

Preferably, a movable shifting collar is disposed around the differential housing, wherein the shifting collar is not engaged with a first driven gear or a second driven gear.

Preferably, the differential further includes a gear assembly that comprises a shaft, which extends into the differential housing. The shaft is coupled to a pair of gears that engage a pair of side gears. The gear assembly and side gears are mounted within and connected to the differential housing.

Preferably, the first portion of the shifting assembly is engaged with the second portion of the shifting assembly.

Preferably, the differential assembly is operable in a first speed state and a second speed state.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION

Figure 1:
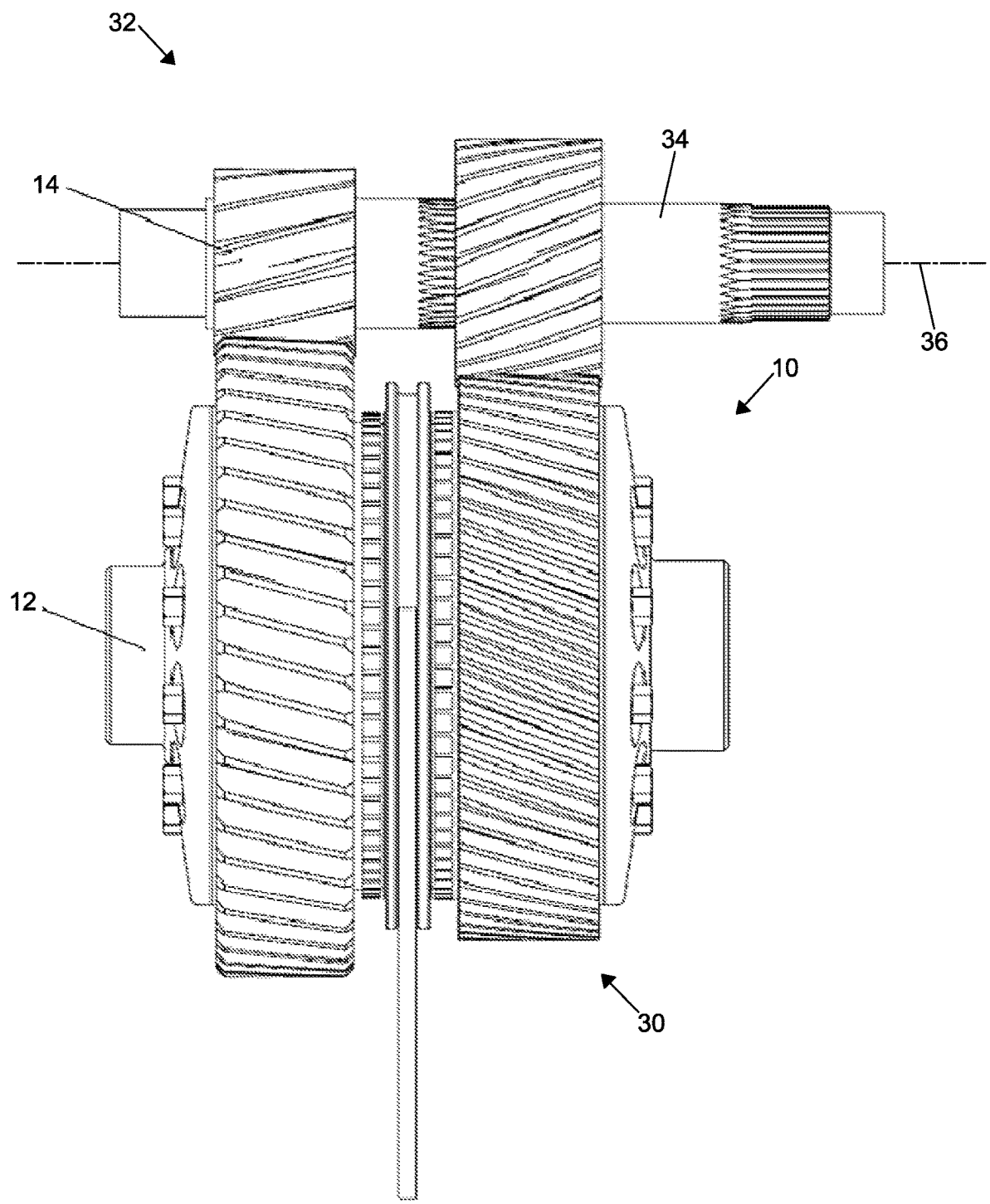
FIG. 1 is a plan view of an embodiment of a differential assembly in accordance with the invention.

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts. Hence, specific dimensions, directions or other physical characteristics relating to the embodiments disclosed are not to be considered as limiting, unless expressly state otherwise. Also, although they may not be, like elements in various embodiments may be commonly referred to with like reference numerals within this section of the application.

Figure 2:
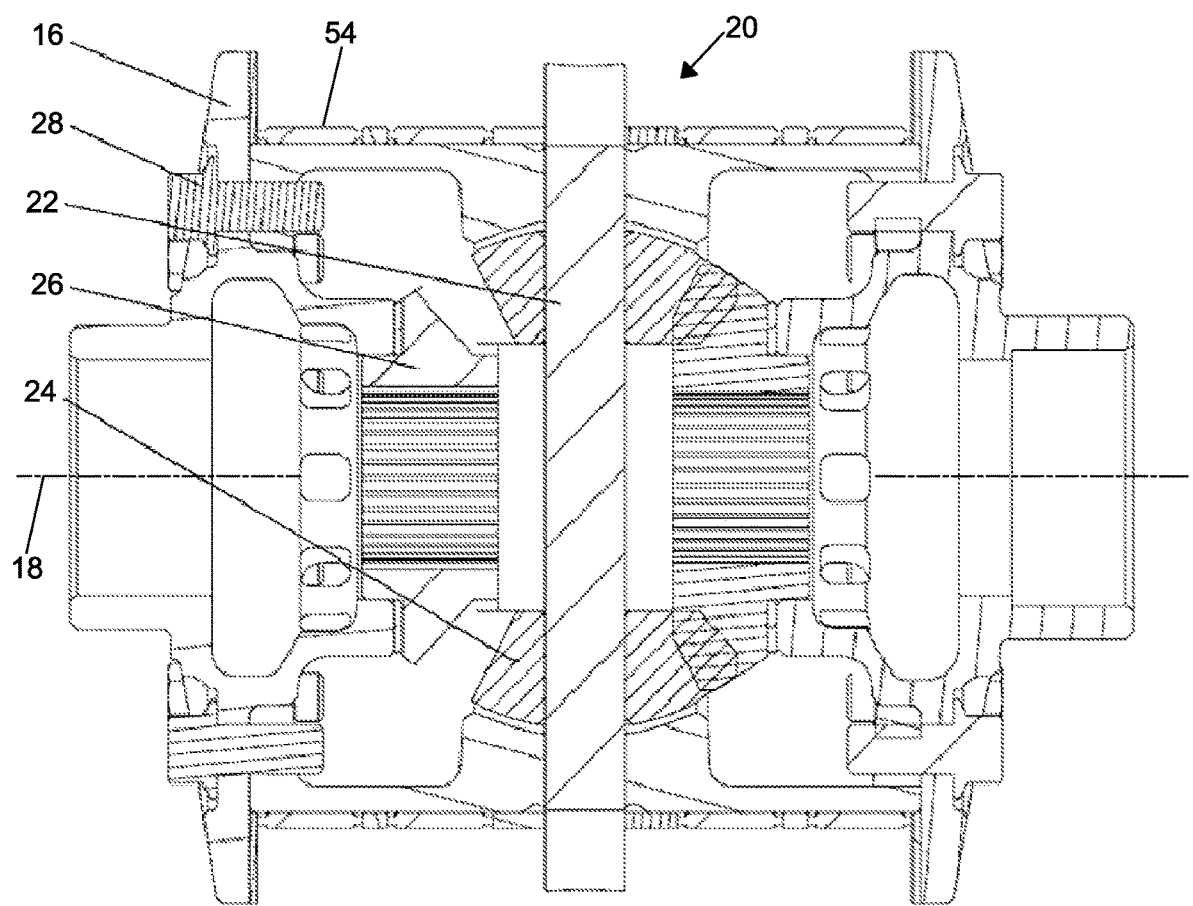
FIG. 2 is a plan view of an embodiment of a portion of the differential assembly of FIG. 1.
Figure 3:
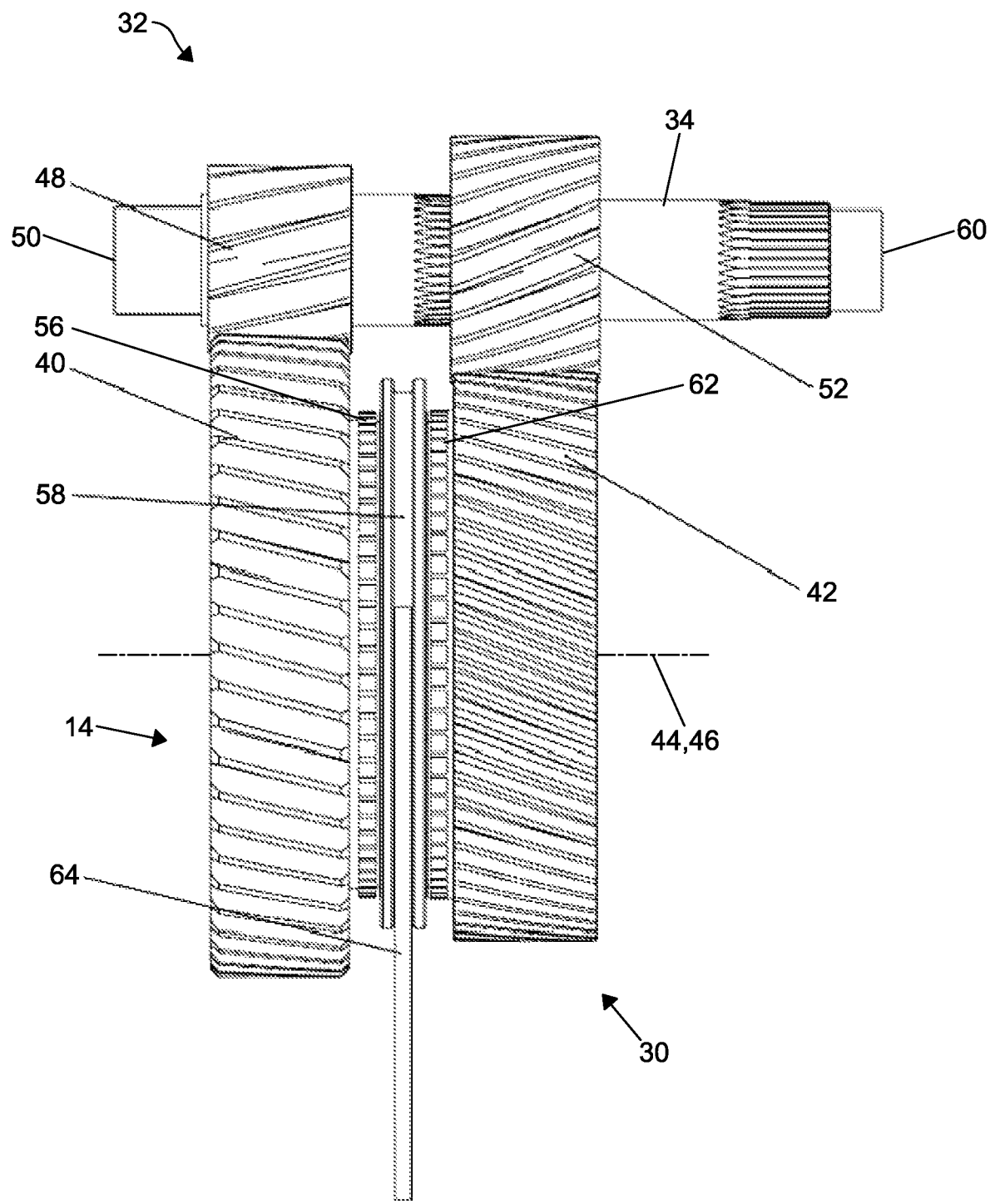
FIG. 3 is a plan view of an embodiment of another portion of the differential assembly of FIG. 1.

Various embodiments of a differential assembly 10 are described herein and illustrated in FIGS. 1-3. The embodiments of the differential assembly 10 described herein may have applications to certain vehicles (not depicted). For example, the differential assembly 10 described herein may have applications to commercial or off-highway vehicles. Also, it would be understood by one of ordinary skill in the art that these embodiments could have industrial, agricultural, locomotive, military, marine, or aerospace applications.

It should be appreciated that one or more differential assemblies may be provided with the vehicle. Each differential assembly 10 may be provided as a portion of a drivetrain. The drivetrain may provide torque to one or more wheel assemblies (not depicted). Each wheel assembly may include a tire mounted on a wheel.

The differential assembly 10 may include an axle housing (not depicted). Certain components of the differential assembly 10 may be disposed within the axle housing. Additionally, the axle housing may be utilized to mount the differential assembly 10 to the vehicle. The axle housing may be conventional in the art and assembled in in any suitable manner. The differential assembly 10 comprises a differential 12 and a shifting assembly 14, each of which may be disposed within the axle housing.

The differential 12 is configured to transmit torque to the wheel assemblies and permits rotation of the wheel assemblies at different velocities. Referring now to FIG. 2, the differential 12 comprises a differential housing 16. The differential housing 16 may be disposed in the axle housing. Other components of the differential 12 may be disposed within the differential housing 16. The differential housing 16 may be configured for rotation about an axis of rotation 18.

An input yoke (not depicted) may enable coupling of the differential assembly 10 to a torque source. For example, the input yoke may be coupled to a drive shaft (not depicted). The input yoke may be disposed on an input shaft (not depicted). The input shaft may be rotatably supported by one or more bearings (not depicted). The one or more bearings may be disposed on the differential housing 16 or in another portion of the axle housing. Torque that is provided to the input yoke may be transmitted to a ring gear (not depicted), which rotates about an axis. Torque may be transmitted from the ring gear to a gear assembly 20.

The gear assembly 20 may comprise a shaft 22, which receives torque from the ring gear. The shaft 22 extends into the differential housing 16. The shaft 22 is coupled to a pair of gears 24. Preferably, each gear of the pair of gears 24 is of the pinion variety. The gear assembly 20 engages a pair of side gears 26 via one or more of the pair of pinion gears. The gear assembly 20 and side gears 26 are mounted within and connected to the differential housing 16 via one or more bolts 28 or other suitable fasteners. This arrangement may enable the differential housing 16 to rotate and transfer torque to the shifting assembly 14. A side gear of the pair of side gears 26 may be fixed to an axle (not depicted). Torque may be transmitted to one or more axles via the side of the pair of side gears 26.

Each axle has a first end that is coupled to the differential 12 via a side gear of the pair of side gears 26 to enable rotation of the axle via the differential 12. Preferably, each axle rotates about an axis of rotation. An axle bearing (not depicted) may be provided to support rotation of an axle. The axle bearing may be positioned between the first end and the second end of the axle.

The shifting assembly 14 enables two-speed shifting. Thus, the differential assembly 10 is enabled to operate in at least a first speed state and a second speed state. In some embodiments, the shifting assembly 14 enables shifting from the first speed state to the second speed state or vice versa. In an embodiment, the shifting assembly 14 allows for the selection of the first speed state, the second speed state, or a neutral state for the differential assembly 10.

As illustrated in FIG. 1, a first portion 30 of the shifting assembly 14 is mounted to the differential 12. More particularly, the first portion 30 of the shifting assembly 14 is mounted to the differential housing 16. A second portion 32 of the shifting assembly 14 is mounting to an output shaft 34. The output shaft 34 has an axis of rotation 36 that is in a parallel relationship with the axis of rotation 18 of the differential housing 16. The output shaft 34 may be utilized to transmit torque from the shifting assembly 14 to one or more wheel assemblies.

The first portion 30 of the shifting assembly 14 is disposed about and coupled to the differential housing 16. In this position, certain portions of the shifting assembly 14 can be selectively engaged and rotate with the differential housing 16. As illustrated, the first portion 30 of the shifting assembly 14 is engaged with the second portion 32 of the shifting assembly 14. Rotation with differential housing 16 enables the first portion 30 of the shifting assembly 14 to transmit torque to the output shaft 34 via the second portion 32 of the shifting assembly 14. Thus, in certain embodiments, the differential housing 16 is adjacent the output shaft 34 to enable torque transfer. One or more portions of the first portion 30 of the shifting assembly 14 may have an axis of rotation 44, 46 that is aligned with the axis of rotation 18 of the differential housing 16. For example, a first driven gear 40 and a second driven gear 42 may each have an axis of rotation 44, 46. The axis of rotation 44 of the first driven gear 40 may be aligned with the axis of rotation 18 of the differential housing 16. Additionally, the axis of rotation 46 of the second driven gear 42 may be aligned with the axis of rotation 18 of the differential housing 16. In the embodiments illustrated, the axis of rotation 44 of the first driven gear 40 and the axis of rotation 46 of the second driven gear 42 may be aligned.

Referring now to FIG. 3, the shifting assembly 14 includes a first active gear 48. The first driven gear 40 and the first active gear 48 are engaged. Each of the first driven gear 40 and the first active gear 48 may have a cylindrical shape. Each of the first driven gear 40 and the first active gear 48 can be a spur gear or a helical gear.

To transfer torque from the first portion of the shifting assembly 14 to the output shaft 34, the first active gear 48 is coupled to the output shaft 34. In an embodiment, the output shaft 34 extends through the first active gear 48. The first active gear 48 is coupled to the output shaft 34 adjacent a first end thereof 50. The first active gear 48 may be coupled to the output shaft 34 via conventional methods. The first active gear 48 may be smaller than a second active gear 52.

The first driven gear 40 is larger than the first active gear 48. The first driven gear 40 is disposed about the outer surface 54 of the differential housing 16 for rotation therewith. The first driven gear 40 comprises meshing teeth 56. Preferably, the meshing teeth 56 are formed on an end of the first driven gear 40. The meshing teeth 56 are provided to allow the first driven gear 40 to be engaged by a shifting collar 58. The shifting collar 58 is utilized to selectively engage the first driven gear 40 with the differential housing 16 to enable torque transfer to the output shaft 34 via the first active gear 48.

Additionally, the shifting assembly 14 includes the second driven gear 42 and the second active gear 52. The second driven gear 42 and the second active gear 52 are engaged. Each of the second driven gear 42 and the second active gear 52 may have a cylindrical shape. Each of the second driven gear 42 and the second active gear 52 can be a spur gear or a helical gear.

To transfer torque from the second portion 32 of the shifting assembly 14 to the output shaft 34, the second active gear 52 is coupled to the output shaft 34. In an embodiment, the output shaft 34 extends through the second active gear 52. The second active gear 52 is coupled to the output shaft 34 adjacent a second end 60 thereof. The first active gear 48 and the second active gear 52 are in a spaced apart relationship on the output shaft 34. The second active gear 52 may be coupled to the output shaft 34 via conventional methods. The second active gear 52 may be smaller than the first active gear 48.

The second driven gear 42 is larger than the second active gear 52. The second driven gear 42 is disposed about the outer surface 54 of the differential housing 16 for rotation therewith. The first driven gear 40 and the second driven gear 42 are in a spaced apart relationship with each other. The second driven gear 42 comprises meshing teeth 62. Preferably, the meshing teeth 62 are formed on an end of the second driven gear 42. The meshing teeth 62 are provided to allow the second driven gear 42 to be engaged by the shifting collar 58. The shifting collar 58 is utilized to selectively engage the second driven gear 42 with the differential housing 16 to enable torque transfer to the output shaft 34 via the second active gear 52.

The shifting collar 58 is disposed around the differential housing 16. In this position, the shifting collar 58 may selectively engage the first driven gear 40 or the second driven gear 42. In embodiments where the shifting collar 58 is engaged with the first driven gear 40, the differential assembly 10 is in the first speed state. In embodiments where the shifting collar 58 is engaged with the second driven gear 42, the differential assembly 10 is in the second speed state. In other embodiments, the shifting collar 58 is not engaged with the first driven gear 40 or the second driven gear 42. In embodiments where the shifting collar 58 is not engaged with the first driven gear 40 or the second driven gear 42, the differential assembly 10 may be in the neutral state. In these embodiments, torque may not be transferred to the output shaft 34 via the shifting assembly 14.

The shifting collar 58 is moveable. In some embodiments, the shifting collar 58 is configured to slide over the differential housing 16. The shifting collar 58 slides over the differential housing 16 between the first driven gear 40 and the second driven gear 42. The shifting collar 58 slides over the differential housing 16 to engage the first driven gear 40 or the second driven gear 42. To engage the first driven gear 40, the shifting collar 58 can be moved toward the first driven gear 40 and away from the second driven gear 42. Similarly, to engage the second driven gear 42, the shifting collar 58 can be moved toward the second driven gear 42 and away from the first driven gear 40. When the first driven gear 40 and the shifting collar 58 are engaged, the meshing teeth 56 of the first driven gear 40 are in mechanical communication with meshing teeth on an end of with the shifting collar 58. Similarly, when the second driven gear 42 and the shifting collar 58 are engaged, the meshing teeth 62 of the second driven gear 42 are in mechanical communication with meshing teeth on the opposite end of the shifting collar 58.

A fork 64 is coupled to the shifting collar 58. Preferably, the fork 64 is disposed around a portion of the shifting collar 58. The fork 64 is utilized to move the shifting collar 58 into engagement with the first driven gear 40 or the second driven gear 42. Alternatively, the fork 64 can be utilized to disengage the shifting collar 58 from the first driven gear 40 or the second driven gear 42. The shift collar 58 may be in mechanical communication with an actuator (not depicted). The actuator can be utilized to urge the fork 64 toward the first driven gear 40 or the second driven gear 42.

From the foregoing detailed description, it will be apparent that various modifications, additions, and other alternative embodiments are possible. The embodiments discussed herein were chosen and described to provide the best illustration of the principles of the axle assembly and its practical application to thereby enable one of ordinary skill in the art to use the axle assembly in various embodiments and with various modifications as are suited to the particular use contemplated. As should be appreciated, all such modifications and variations are within the scope of the invention.

The invention claimed is:

1. A differential assembly, comprising:
   a differential comprising:
   a shaft extending from outside of the differential housing to inside of the differential housing;
   a differential housing configured for rotation, the differential housing comprising:
   an outer surface extending around the differential, and
   a first end cap fastened to a first end of the differential and a second end cap fastened to a second end of the differential, and the first end cap, the second end cap, and the shaft extending beyond the outer surface of the differential housing;
   a first driven gear and a second driven gear disposed about the outer surface of the differential housing, the first driven gear positioned within a first slot formed by the first end cap and the shaft, and the second driven gear positioned within a second slot formed by the second end cap and the shaft;
   a first active gear and a second active gear coupled to an output shaft, the first active gear engaged with first driven gear, and the second active gear engaged with second driven gear; and
   a movable shifting collar disposed around the differential housing, and the shifting collar engaging the first driven gear with the differential housing in a first position and engaging second driven gear with the differential housing in a second position.

2. The differential assembly of claim 1, wherein, in a neutral position, the shifting collar is not engaged with a first driven gear or a second driven gear and the first driven gear and the second driven gear are not engaged with the differential.

3. The differential assembly of claim 1, wherein the differential further includes a gear assembly that comprises a shaft, which extends into the differential housing, the shaft being coupled to a pair of gears that engage a pair of side gears, the gear assembly and side gears being mounted within and connected to the differential housing.

4. The differential assembly of claim 1, wherein the differential assembly is operable in a first speed state and a second speed state.

5. The differential assembly of claim 1, wherein the first driven gear and the second driven gear are each a spur gear.

6. The differential assembly of claim 1, wherein the differential housing has an axis of rotation and the output shaft has an axis of rotation that is in a parallel relationship with the axis of rotation of the differential assembly.

7. The differential assembly of claim 1, wherein the first active gear and the second active gear are each a spur gear.

8. A differential assembly, comprising:
   a differential comprising:
   a shaft extending from outside of the differential housing to inside of the differential housing;
   a differential housing comprising:
   an outer surface extending circumferentially around the differential,
   a first end cap fastened a first end of the differential by fasteners passing through the first end cap in an axial direction, and
   a second end cap fastened to a second end of the differential by fasteners passing through the second end cap in the axial direction, and the second end cap, the first end cap, and the shaft extending radially beyond the outer surface of the differential housing;

a first driven gear and a second driven gear disposed about the outer surface of the differential housing, the first driven gear and the second driven gear each have meshing teeth which are separate from and coaxial with primary teeth of the first driven gear and the second driven, the first driven gear positioned between a radial face of the first end cap and a first radial face of the shaft, and the second driven gear positioned between a radial face of the second end cap and a second radial face of the shaft, a first active gear and a second active gear coupled to an output shaft, the first active gear engaged with first driven gear, and the second active gear engaged with second driven gear; and a movable shifting collar disposed around the outer surface of the differential housing, and the shifting collar engaging the first driven gear with the differential housing in a first axial position and engaging second driven gear with the differential housing in a second axial position, and the shifting collar engages with the first driven gear and the second driven gear via the meshing teeth.

9. The differential assembly of claim 8, wherein the shifting collar is configured to slide over the differential housing to engage the meshing teeth of the first driven gear or the second driven gear.

10. The differential assembly of claim 1, further comprising a fork that is coupled to the shifting collar and moves the shifting collar into engagement with the first driven gear or the second driven gear.

11. The differential assembly of claim 1, wherein the first driven gear, the first active gear, the second driven gear, and the second active gear are each of a cylindrical shape.

12. The differential assembly of claim 8, wherein the meshing teeth and the primary teeth of the first driven gear and the second driven gears are radial.

13. The differential assembly of claim 12, wherein the shifting collar moves axially to engage the radial meshing teeth.

14. The differential assembly of claim 8, wherein the meshing teeth have a smaller radius than the primary teeth.

15. The differential assembly of claim 8, wherein the first driven gear has a larger radius than the second driven gear, and the first active gear has a smaller radius than the second active gear.

16. The differential assembly of claim 8, wherein the first driven gear, the second driven gear, the first active gear, and the second active gear are helical gears.

17. The differential assembly of claim 8, wherein the meshing teeth are axially adjacent to the primary teeth.

18. The differential assembly of claim 8, wherein, in a neutral position of the meshing collar, the meshing collar is not engaged with the first driven gear or the second driven gear and the first driven gear and the second driven gear are not engaged with the differential.

* * * * *